United States Patent
Kuczynski et al.

(10) Patent No.: US 8,791,186 B2
(45) Date of Patent: Jul. 29, 2014

(54) INDICATION OF IMPROPERLY MOLDED PARTS

(75) Inventors: Joseph Kuczynski, Rochester, MN (US); Melissa K. Miller, Research Triangle Park, NC (US); Heidi D. Williams, Cary, NC (US); Jing Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/312,550

(22) Filed: Dec. 6, 2011

(65) Prior Publication Data

US 2013/0143993 A1    Jun. 6, 2013

(51) Int. Cl.
- *C08K 3/16* (2006.01)
- *C08K 3/30* (2006.01)
- *B29C 33/10* (2006.01)
- *B29C 39/44* (2006.01)
- *B29C 43/52* (2006.01)

(52) U.S. Cl.
USPC ........... 524/407; 524/408; 524/413; 524/423; 524/435; 264/40.1; 264/80; 264/219; 264/319

(58) Field of Classification Search
USPC ............ 524/423, 407, 408, 413, 435; 264/80, 264/40.1, 219, 319
See application file for complete search history.

(56) References Cited

U.S. PATENT DOCUMENTS

| | | | |
|---|---|---|---|
| 4,429,998 A | 2/1984 | Carson et al. | |
| 7,175,790 B2 | 2/2007 | Emadipour et al. | |
| 2003/0158314 A1 * | 8/2003 | Abu-Isa et al. | 524/409 |
| 2006/0131771 A1 | 6/2006 | McBain et al. | |
| 2007/0298227 A1 | 12/2007 | Tai et al. | |
| 2011/0135950 A1 | 6/2011 | Okamoto et al. | |

OTHER PUBLICATIONS

Zondag et al., "Characterisation of MgSO4 for Thermochemical Storage", Article—ECN, 1755 ZG Petten, The Netherlands, 6 pages.

* cited by examiner

*Primary Examiner* — Kriellion Sanders
(74) *Attorney, Agent, or Firm* — Katherine S. Brown; Jeffrey L. Streets

(57) ABSTRACT

A method of determining that a thermoplastic was insufficiently dried before forming into a molded plastic part. The method comprises preparing a mixture of a thermoplastic polymer and an off-gassing compound, wherein the off-gassing compound is selected to release all water of hydration in response to target drying conditions specified for the thermoplastic polymer. The mixture is dried at actual drying conditions, and then heated to reduce the viscosity of the thermoplastic polymer and allow the mixture to flow. The mixture is then made to flow into a mold to form a plastic part at a molding temperature, wherein the molding temperature will cause any remaining water of hydration in the off-gas sing compound to off-gas and form surface irregularities in the plastic part. Non-limiting examples of the off-gassing compound include hydrated metal halides and ionic hydrates.

20 Claims, 1 Drawing Sheet

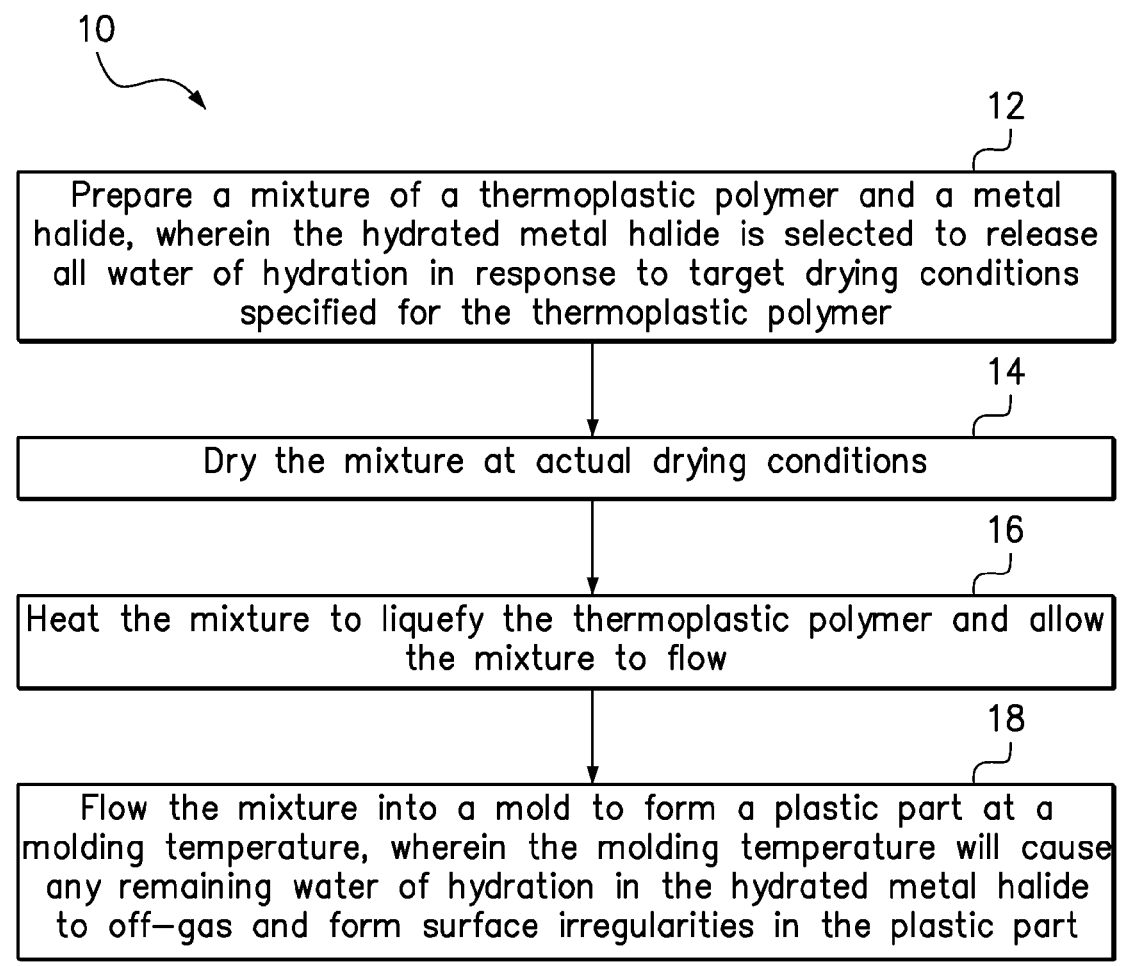

INDICATION OF IMPROPERLY MOLDED PARTS

BACKGROUND

1. Field of the Invention

The present invention relates to the formation of molded thermoplastic parts.

2. Background of the Related Art

Computer systems are complex combinations of parts working together to accomplish a design objective. Aside from the actual computers, servers, switches, network hardware and the like, the infrastructure used to arrange and manage the computer hardware can also be complex and may involve numerous parts that are specially made for a particular purpose.

Plastic parts are beneficial for use in the infrastructure of a computer system because they are inexpensive to make, they are generally electronically non-conductive, and they are strong without being heavy. Accordingly, many of components in the computer system will be made from plastic. Furthermore, these same advantages that make plastic a useful material in computer systems also makes plastics useful in many other applications, ranging from household items to automotive parts just to name a few.

However, plastic parts must be processed properly in order to obtain their intended physical properties, such as strength. For example, it is important to remove moisture from a thermoplastic polymer material prior to processing. It is unfortunate that manufacturers may under dry the thermoplastic in an effort to increase cycle time, cut costs, or both. As a result, these parts may be processed at conditions outside of the resin manufacturer's recommended parameters, resulting in molded plastic parts with compromised physical properties.

Unfortunately, the compromised physical properties of the molded plastic part may not become evident until long after the part has been put into service and suffers a failure during use. At that point, the failed part must be replaced at the expense of the additional part, inconvenience, and potential downtime of related devices. For example, if a plastic latch used to secure a hard disk drive into a chassis bay was formed under improper conditions, the latch may break during use. As a result of the broken latch, a new latch or new carriage for the hard drive may be required. Until the broken part is satisfactorily replaced, the hard drive may remain out-of-service.

BRIEF SUMMARY

One embodiment of the present invention provides a method comprising preparing a mixture of a thermoplastic polymer and an off-gassing compound, wherein the off-gassing compound is selected to release all water of hydration in response to target drying conditions specified for the thermoplastic polymer. The mixture is dried at actual drying conditions, then heated to reduce the viscosity of the thermoplastic polymer and allow the mixture to flow. The mixture is then made to flow into a mold to form a plastic part at a molding temperature, wherein the molding temperature will cause any remaining water of hydration in the off-gassing compound to off-gas and form surface irregularities in the plastic part.

Another embodiment of the present invention provides a thermoplastic polymer formulation comprising a mixture of a thermoplastic polymer pellets and between 1 and 5 weight percent of an off-gassing compound, wherein the off-gassing compound is selected to release all water of hydration in response to target drying conditions specified for the thermoplastic polymer, yet retain some or all of the water of hydration in response to drying conditions less that the target drying conditions.

BRIEF DESCRIPTION OF THE SEVERAL VIEWS OF THE DRAWINGS

FIG. 1 is a flowchart of a method of determining that a thermoplastic was insufficiently dried before forming into a molded plastic part.

DETAILED DESCRIPTION

One embodiment of the present invention provides a method for determining that a thermoplastic was insufficiently dried before forming the thermoplastic into a molded plastic part. The method comprises preparing a mixture of a thermoplastic polymer and an off-gassing compound, wherein the off-gassing compound is selected to release all water of hydration in response to target drying conditions specified for the thermoplastic polymer. The mixture is dried at actual drying conditions, and then further heated to a melt temperature that reduces the viscosity of the thermoplastic polymer and allows the mixture to flow. The mixture is then made to flow into a mold to form a plastic part at a molding temperature, wherein the molding temperature will cause any remaining water of hydration in the off-gassing compound to be released as a gas or vapor and form surface irregularities in the plastic part.

The off-gassing compounds may be any compound that off-gasses under defined conditions, but is otherwise inert to the thermoplastic. Non-limiting examples of the off-gassing compounds include hydrated metal halides and ionic hydrates. The ionic hydrates may be without limitation, selected, from $Na_2SO_4 \cdot 10H_2O$, $KAl(SO_4)_2$, $CuSO_4$, and $MgSO_4*7H_2O$. Hydrated metal halides are chemically stable and inert, except toward water, and may be regenerated by heating at 200 to 225° C. (for example) for one to two hours. Examples of hydrated metal halides are listed in Table 1, below, and include without limitation: $VCl_3(H_2O)_6$, $VBr_3(H_2O)_6$, $VI_3(H_2O)_6$, $CrCl_3(H_2O)_6$, $CrCl_3(H_2O)_6$, $CrCl_2(H_2O)_4$, $CrCl_3(H_2O)_6$, $MnCl_2(H_2O)_6$, $MnCl_2(H_2O)_4$, $MnBr_2(H_2O)_4$, $MnCl_2(H_2O)_2$, $MnBr_2(H_2O)_2$, $FeCl_2(H_2O)_6$, $FeCl_2(H_2O)_4$, $FeBr_2(H_2O)_4$, $FeCl_2(H_2O)_2$, $CoCl_2(H_2O)_6$, $CoBr_2(H_2O)_6$, $CoBr_2(H_2O)_4$, $CoCl_2(H_2O)_4$, $CoCl_2(H_2O)_2$, $CoBr_2(H_2O)_2$, $NiCl_2(H_2O)_6$, $NiCl_2(H_2O)_4$, $NiBr_2(H_2O)_6$, $NiCl_2(H_2O)_2$, $CuCl_2(H_2O)_2$, and $CuBr_2(H_2O)_4$. Each hydrated metal halide has a temperature at which the water of hydration in the compound is completely released. These dehydration temperatures are documented in the literature, but may also be easily determined using thermogravimetric analysis. For example, $MgSO_4*7H_2O$ dehydrates at 150° C.

Non-limiting examples of the injection moldable thermoplastics include polycarbonate (PC), acrylonitrile butadiene styrene (ABS), polyethylene terephthalate (PET), polybutylene terephthalate (PBT), liquid crystal polymers (LCP), polyamide (PA), polyphenylene oxide (PPO), any other injection moldable thermoplastic, or blends of thermoplastics.

For any given thermoplastic, the manufacturer will provide recommended conditions for complete drying of the resin. If those recommended conditions are not used, the thermoplastic is likely to contain moisture during the molding process and the resulting parts will be damaged. An off-gassing compound may be selected for use with the thermoplastic such that the off-gassing compound will off-gas its water of hydration under the recommended thermoplastic drying conditions, but will not completely off-gas under substantially lesser drying conditions. The thermoplastic is typically in the form of pellets and the off-gassing compound is added into the plastic pellets to form an intimate mixture prior to drying. It should be recognized that recommended drying conditions may specify more than just a drying temperature, perhaps including a duration of drying at the drying temperature and other conditions, such as ventilation or dehumidification. In much of the following discussion the focus is directed at the drying temperature, but it should be recognized that other aspects of the drying conditions may also be necessary for complete drying to occur.

In one example, a suitable off-gassing compound might be one that off-gases its water of hydration at a temperature that is up to 10° C. lower than the recommended drying temperature for the thermoplastic it is being mixed into. Preferably, the off-gas sing compound will dehydrate at a temperature that is lower than the recommended drying temperature by less than 5° C. However, it should be recognized that an empirical determination may be used to identify the exact off-gassing compound selected and an acceptable margin between the dehydration temperature of a selected off-gassing compound and the recommended drying temperature for a given thermoplastic. If the recommended temperature is used to dry the thermoplastic, then the off-gassing compound off-gasses during the drying step and will not cause surface irregularities in the molded plastic part. However, if the thermoplastic is dried at a temperature that is below the dehydration (or other off-gassing) temperature of the off-gassing compound, then the off-gassing compound will off-gas during the molding of the plastic part and cause visibly detectable surface irregularities, such as bubbles and voids. An off-gassing compound that off-gases only at temperatures greater than the drying temperature recommended for a given thermoplastic would not be a good selection for mixing with the given thermoplastic, since surface irregularities would be formed due to off-gassing that would occur despite using the recommended drying conditions.

For each hydrated metal halide in Table 1, the third column shows the number of equivalents of water of crystallization that is not bound to the metal halide. Accordingly, it can be seen that some of the hydrated metal halides have one equivalent of water of crystallization that is not bound to the metal halide, and others have two equivalents of water of crystallization that are not bound to the metal halide.

TABLE 1

Examples of Hydrated Metal Halide Compositions

| Formula of hydrated metal halide | Coordination sphere of the metal | Equivalents of water of crystallization that are not bound to the metal |
|---|---|---|
| $VCl_3(H_2O)_6$ | trans-$[VCl_2(H_2O)_4]^+$ | two |
| $VBr_3(H_2O)_6$ | trans-$[VBr_2(H_2O)_4]^+$ | two |
| $VI_3(H_2O)_6$ | trans-$[V(H_2O)_6]^{3+}$ | none |
| $CrCl_3(H_2O)_6$ | trans-$[CrCl_2(H_2O)_4]^+$ | two |
| $CrCl_3(H_2O)_6$ | $[CrCl(H_2O)_5]^{2+}$ | one |
| $CrCl_2(H_2O)_4$ | trans-$[CrCl_2(H_2O)_4]^+$ | none |
| $CrCl_3(H_2O)_6$ | $[Cr(H_2O)_6]^{3+}$ | none |
| $MnCl_2(H_2O)_6$ | trans-$[MnCl_2(H_2O)_4]$ | two |
| $MnCl_2(H_2O)_4$ | cis-$[MnCl_2(H_2O)_4]$ | none |
| $MnBr_2(H_2O)_4$ | cis-$[MnBr_2(H_2O)_4]$ | none |
| $MnCl_2(H_2O)_2$ | trans-$[MnCl_4(H_2O)_2]$ | none |
| $MnBr_2(H_2O)_2$ | trans-$[MnBr_4(H_2O)_2]$ | none |
| $FeCl_2(H_2O)_6$ | trans-$[FeCl_2(H_2O)_4]$ | two |
| $FeCl_2(H_2O)_4$ | trans-$[FeCl_2(H_2O)_4]$ | none |
| $FeBr_2(H_2O)_4$ | trans-$[FeBr_2(H_2O)_4]$ | none |
| $FeCl_2(H_2O)_2$ | trans-$[FeCl_2(H_2O)_2]$ | none |
| $CoCl_2(H_2O)_6$ | trans-$[CoCl_2(H_2O)_4]$ | two |
| $CoBr_2(H_2O)_6$ | trans-$[CoBr_2(H_2O)_4]$ | two |
| $CoBr_2(H_2O)_4$ | trans-$[CoBr_2(H_2O)_4]$ | none |
| $CoCl_2(H_2O)_4$ | cis-$[CoCl_2(H_2O)_4]$ | none |
| $CoCl_2(H_2O)_2$ | trans-$[CoCl_4(H_2O)_2]$ | none |
| $CoBr_2(H_2O)_2$ | trans-$[CoBr_4(H_2O)_2]$ | none |
| $NiCl_2(H_2O)_6$ | trans-$[NiCl_2(H_2O)_4]$ | two |
| $NiCl_2(H_2O)_4$ | cis-$[NiCl_2(H_2O)_4]$ | none |
| $NiBr_2(H_2O)_6$ | trans-$[NiBr_2(H_2O)_4]$ | two |
| $NiCl_2(H_2O)_2$ | trans-$[NiCl_2(H_2O)_4]$ | none |
| $CuCl_2(H_2O)_2$ | $[CuCl_4(H_2O)_2]_2$ | none |
| $CuBr_2(H_2O)_4$ | $[CuBr_4(H_2O)_2]_n$ | two |

The color of a particular off-gassing compound may also be used as a selection criterion for identifying an off-gassing compound that is suitable be mixed with a particular thermoplastic formulation. Specifically, it is preferable to select an off-gas sing compound having a color that is similar to that of the thermoplastic, so that, subject to using the recommended drying conditions, the off-gassing compound does not affect the cosmetic properties of the resin. For example, the compounded plastic (i.e., plastic plus off-gassing compound) may be color matched to the specific thermoplastic using well established techniques in the industry.

One of the non-limiting examples of off-gassing compounds listed in Table 1 is compounded with the thermoplastic resin in a concentration that is sufficient to result in a visible cosmetic defect if improperly dried. For example, a hydrated metal halide may be added to the thermoplastic in the range of 1 to 5 weight percent (wt %). If the thermoplastic resin contained residual moisture in the absence of the hydrated metal halide, that residual moisture level is typically insufficient to result in a visible defect in the molded plastic part. However, that same residual moisture level can result in compromised physical properties of the plastic part, such as chain scission and embrittlement of the thermoplastic. These types of defects often go undetected until after the plastic part has been put into use. Using a suitable concentration of the hydrated metal halide, or other off-gassing compound, causes an immediate visible indication that the thermoplastic was insufficiently dried and that the resulting plastic part should not be used.

In one embodiment of the present invention, the method further comprises detecting whether the molded plastic part has surface irregularities indicating that the actual drying conditions did not achieve the target drying conditions specified for the thermoplastic polymer. More to the point, the detection of surface irregularities in the molded plastic part indicates that water remained in the mixture during formation of the plastic part and that the physical properties of the thermoplastic may be compromised. Optionally, the method may then further include discarding the molded plastic part in response to detecting surface irregularities in the plastic part. Conversely, the method may further include installing the molded plastic part in a finished product in response to detecting no surface irregularities in the plastic part.

Detecting whether the molded plastic part has surface irregularities may include visually inspecting the molded plastic part. The ability to visually detect the surface irregularities and attribute those irregularities to improper drying is very beneficial. For one thing, the manufacturer of the plastic part is unable to hide the surface defects and is thereby prevented from using less than the recommended drying conditions. The term "visual" is intended to encompass both human sight and the use of optical detection techniques, such as using cameras and image analysis software.

In one hypothetical example in accordance with the invention, 5 wt % of $MgSO_4*7H_2O$ (the additive) is added to a generic ignition resistant liquid crystal polymer (LCP) (e.g., Ticona Vectra LCP A grades). Vectra LCP A grade is typically dried at 150° C. for a minimum of 4 hours and virtually all of the water of hydration in $MgSO_4*7H_2O$ is lost at temperatures below 150° C. during this period. If the dryer vessel temperature is below 150° C., the water of hydration is retained. In fact, the lower the dryer temperature below 150° C., the greater the amount of retained water of hydration. Vectra LCP A grades are typically molded at 285-295° C., a temperature that will ensure complete dehydration of $MgSO_4*7H_2O$. Therefore, if the LCP is dried properly, all of the water of hydration is removed from the plastic pellets and the molded part will be acceptable, since there is no remaining water of hydration to be lost during the molding process. In other words, if the plastic has been properly dried, then the additive will have no effect on the molding of the plastic part. However, if the LCP is dried either at temperatures lower than 150° C. or for a period of duration shorter than 4 hrs, then the additive will retain at least some of its water of hydration. As the additive with retained water of hydration is heated to the melt temperature and forced by the screw into the mold, rapid out gassing of the water of hydration will occur and either render the molded part unacceptable (via bubbles or voids in the part) or prevent closing of the mold. In either case, the resulting plastic parts will not be usable.

FIG. 1 is a flowchart of a method of determining that a thermoplastic was insufficiently dried before forming into a molded plastic part. In step 12, a mixture of a thermoplastic polymer and a hydrated metal halide are prepared, wherein the hydrated metal halide is selected to release all water of hydration in response to target drying conditions specified for the thermoplastic polymer. In step 14, the mixture is dried at actual drying conditions. The mixture is then heated, in step 16, to reduce the viscosity of the thermoplastic polymer and allow the mixture to flow. In step 18, the mixture is caused to flow into a mold to form a plastic part at a molding temperature, wherein the molding temperature will cause any remaining water of hydration in the metal halide to off-gas and form surface irregularities in the plastic part. The method may further include other optional aspects described above in accordance with the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
drying a mixture of a thermoplastic polymer and an off-gassing compound under actual drying conditions, wherein the off-gassing compound is selected to release all water of hydration in response to target drying conditions specified for the thermoplastic polymer;
heating the mixture to reduce the viscosity of the thermoplastic polymer and allow the mixture to flow; and
flowing the mixture into a mold to form a plastic part at a molding temperature, wherein the molding temperature will cause any remaining water of hydration in the off-gassing compound to off-gas and form surface irregularities in the plastic part.

2. The method of claim 1, further comprising:
detecting whether the molded plastic part has surface irregularities indicating that the actual drying conditions did not achieve the target drying conditions specified for the thermoplastic polymer.

3. The method of claim 1, further comprising:
detecting whether the molded plastic part has surface irregularities indicating that water remained in the mixture during formation of the plastic part and the physical properties of the thermoplastic may be compromised.

4. The method of claim 3, further comprising:
discarding the molded plastic part in response to detecting surface irregularities in the plastic part.

5. The method of claim 3, further comprising:
installing the molded plastic part in a finished product in response to detecting no surface irregularities in the plastic part.

6. The method of claim 3, wherein the step of detecting whether the molded plastic part has surface irregularities includes visually inspecting the molded plastic part.

7. The method of claim 1, wherein the mixture includes between 1 and 5 weight percent of the off-gassing compound.

8. The method of claim 1, wherein the surface defects are selected from bubbles and voids.

9. The method of claim 1, wherein the physical properties of the molded plastic part are compromised if there is water present in the thermoplastic during formation of the molded plastic part.

10. The method of claim 1, wherein the off-gassing compound has a color that is matched to the color of the thermoplastic.

11. The method of claim 1, wherein the off-gassing compound is chemically stable and inert toward all components of the polymer formulation except any water that is present.

12. The method of claim 1, wherein the off-gassing compound is an ionic hydrate.

13. The method of claim 1, wherein the off-gassing compound is selected from $Na_2SO_4 \cdot 10H_2O$, $KAl(SO_4)_2$, $CuSO_4$, and $MgSO_4*7H_2O$.

14. The method of claim 1, wherein the off-gassing compound is a hydrated metal halide.

15. The method of claim 14, wherein the hydrated metal halide is selected from $VCl_3(H_2O)_6$, $VBr_3(H_2O)_6$, $VI_3(H_2O)_6$, $CrCl_3(H_2O)_6$, $CrCl_3(H_2O)_6$, $CrCl_2(H_2O)_4$, $CrCl_3(H_2O)_6$, $MnCl_2(H_2O)_6$, $MnCl_2(H_2O)_4$, $MnBr_2(H_2O)_4$, $MnCl_2(H_2O)_2$, $MnBr_2(H_2O)_2$, $FeCl_2(H_2O)_6$, $FeCl_2(H_2O)_4$, $FeBr_2(H_2O)_4$, $FeCl_2(H_2O)_2$, $CoCl_2(H_2O)_6$, $CoBr_2(H_2O)_6$, $CoBr_2(H_2O)_4$, $CoCl_2(H_2O)_4$, $CoCl_2(H_2O)_2$, $CoBr_2(H_2O)_2$, $NiCl_2(H_2O)_6$, $NiCl_2(H_2O)_4$, $NiBr_2(H_2O)_6$, $NiCl_2(H_2O)_2$, $CuCl_2(H_2O)_2$, and $CuBr_2(H_2O)_4$.

16. The method of claim 1, wherein the thermoplastic is selected from polycarbonate (PC), acrylonitrile butadiene styrene (ABS), polyethylene terephthalate (PET), polybutylene terephthalate (PBT), liquid crystal polymers (LCP), polyamide (PA), polyphenylene oxide (PPO), and any blends thereof.

17. A thermoplastic polymer formulation, comprising:
a mixture of a thermoplastic polymer pellets and between 1 and 5 weight percent of an off-gassing compound, wherein the off-gassing compound is selected to release all water of hydration in response to target drying conditions specified for the thermoplastic polymer, yet retain some or all of the water of hydration in response to drying conditions less that the target drying conditions.

18. The thermoplastic polymer formulation of claim 17, wherein the off-gassing compound is an ionic hydrate.

19. The thermoplastic polymer formulation of claim 17, wherein the off-gassing compound is a hydrated metal halide.

20. The thermoplastic polymer formulation of claim 17, wherein the thermoplastic is selected from polycarbonate (PC), acrylonitrile butadiene styrene (ABS), polyethylene terephthalate (PET), polybutylene terephthalate (PBT), liquid crystal polymers (LCP), polyamide (PA), polyphenylene oxide (PPO), and any blends thereof.

* * * * *